(12) United States Patent
Gladnick et al.

(10) Patent No.: US 12,204,226 B2
(45) Date of Patent: *Jan. 21, 2025

(54) METROLOGY SYSTEM CONFIGURED TO ILLUMINATE AND MEASURE APERTURES OF WORKPIECES

(71) Applicant: Mitutoyo Corporation, Kanagawa-ken (JP)

(72) Inventors: Paul Gerard Gladnick, Seattle, WA (US); Christopher Richard Hamner, Kirkland, WA (US); Pavel Ivanovich Nagornykh, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 82 days.

This patent is subject to a terminal disclaimer.

(21) Appl. No.: 18/324,027

(22) Filed: May 25, 2023

(65) Prior Publication Data

US 2024/0393657 A1    Nov. 28, 2024

(51) Int. Cl.
*G02F 1/29* (2006.01)
*G01B 11/24* (2006.01)
(Continued)

(52) U.S. Cl.
CPC .......... *G02F 1/294* (2021.01); *G01B 11/2408* (2013.01); *G02F 1/33* (2013.01);
(Continued)

(58) Field of Classification Search
CPC ....................................................... G02F 1/294
See application file for complete search history.

(56) References Cited

U.S. PATENT DOCUMENTS

| 5,197,105 A | * | 3/1993 | Uemura | G01R 31/309 348/126 |
| 5,539,622 A | * | 7/1996 | Ishikawa | G03B 15/05 362/18 |

(Continued)

FOREIGN PATENT DOCUMENTS

WO    WO 2019/232563 A1    12/2019

OTHER PUBLICATIONS

Mermillod-Blondin et al., "High-speed varifocal imaging with a tunable acoustic gradient index of refraction lens," Department of Mechanical and Aerospace Engineering, Princeton University, *Optics Letters* 33(18):2146-2148, Sep. 15, 2008, 3 pages.

*Primary Examiner* — Daniel T Tekle
(74) *Attorney, Agent, or Firm* — Seed IP Law Group LLP

(57) ABSTRACT

A metrology system includes front and back vision components portions, and is configured to have a workpiece positioned between the two portions. The back vision components portion includes a light source and a diffuser. The front vision components portion includes a variable focal length lens, an objective lens and a camera. The metrology system includes a movement mechanism portion configured to align relative positions between the front and back vision components portions and an aperture defined through the workpiece such that at least a portion of the light from the light source that passes through the diffuser passes through the aperture for providing the illumination for imaging the aperture. The camera acquires an image stack of images of the aperture at different focus positions. Based on an analysis of the image stack, measurements related to workpiece features of the aperture (e.g., including a distance between workpiece features) can be determined.

20 Claims, 7 Drawing Sheets

(51) Int. Cl.
  *G02F 1/33* (2006.01)
  *G06T 7/60* (2017.01)
  *G06T 7/73* (2017.01)
  *H04N 23/56* (2023.01)

(52) U.S. Cl.
  CPC ............... *G06T 7/60* (2013.01); *G06T 7/74* (2017.01); *H04N 23/56* (2023.01); *G06T 2207/10148* (2013.01); *G06T 2207/30164* (2013.01)

(56) References Cited

U.S. PATENT DOCUMENTS

| | | |
|---|---|---|
| 6,542,180 B1 | 4/2003 | Wasserman et al. |
| 7,627,162 B2 | 12/2009 | Blanford et al. |
| 8,194,307 B2 | 6/2012 | Arnold et al. |
| 8,581,162 B2 | 11/2013 | Campbell |
| 9,060,117 B2 | 6/2015 | Bryll et al. |
| 9,143,674 B2 | 9/2015 | Gladnick |
| 9,726,876 B2 | 8/2017 | Bryll |
| 9,736,355 B1 | 8/2017 | Bryll |
| 9,830,694 B2 | 11/2017 | Bryll |
| 9,930,243 B2 | 3/2018 | Gladnick et al. |
| 10,101,572 B2 | 10/2018 | Bryll et al. |
| 10,178,321 B2 | 1/2019 | Emtman et al. |
| 10,520,650 B2 | 12/2019 | Freerksen et al. |
| 10,880,468 B1 | 12/2020 | Bryll |
| 11,112,541 B2 | 9/2021 | Tobiason |
| 11,119,382 B2 | 9/2021 | Gladnick |
| 11,125,967 B2 | 9/2021 | Gladnick |
| 11,249,225 B2 | 2/2022 | Gladnick |
| 2011/0310270 A1* | 12/2011 | Gladnick ............ G01N 21/8806 348/E5.037 |
| 2013/0044300 A1* | 2/2013 | Mei ....................... G03F 9/7088 355/52 |
| 2021/0191228 A1* | 6/2021 | Gladnick ............. G02B 21/367 |
| 2021/0372769 A1 | 12/2021 | Eiles |
| 2023/0168209 A1* | 6/2023 | Gladnick ............ G01N 21/8806 356/237.2 |

* cited by examiner

METROLOGY SYSTEM CONFIGURED TO ILLUMINATE AND MEASURE APERTURES OF WORKPIECES

BACKGROUND

Technical Field

This disclosure relates to precision metrology, and more particularly to precision workpiece measurement systems.

Description of Related Art

Quality control for the production of objects (e.g., workpieces) that include specific features (e.g., produced by molding and/or machining, or the like), is becoming increasingly demanding in terms or throughput, measurement resolution, and accuracy. Ideally, such workpieces should be measured/inspected to ensure proper dimensions, function, etc. However, micron level, or even sub-micron level, measurement tolerances may be required in order to confirm a workpiece with desired characteristics for some applications.

Various precision metrology systems may be used for workpiece measurements and inspection. For example, certain precision metrology systems such as machine vision inspection systems (or "vision systems" for short) may be utilized to obtain images of workpieces for inspection. Such systems may be utilized for various types of applications (e.g., general workpiece inspection, metrology applications for determining precise dimensional measurements of workpieces, etc.).

Such metrology systems have typically faced various types of challenges for measuring and inspecting workpieces (e.g., due to variations in the types of features of the workpieces, the illumination required for the imaging and measuring of the features of the workpieces, etc.). A system that can provide improvements with respect to such issues for certain types of measurement and inspection operations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a metrology system is provided which includes a back vision components portion and a front vision components portion. The metrology system is configured to have a workpiece positioned between the front vision components portion and the back vision components portion. The back vision components portion includes a light source and a diffuser located in the path of the light from the light source. The front vision components portion includes a variable focal length (VFL) lens that is controlled to periodically modulate optical power of the VFL lens over a range of optical powers that occur at respective phase timings within the periodic modulation. The front vision components portion includes an objective lens that defines an optical axis of the front vision components portion, that inputs workpiece light arising from the workpiece which is illuminated by the light source, and that transmits the workpiece light along an imaging optical path that passes through the VFL lens. The front vision components portion includes a camera that receives the workpiece light transmitted by the VFL lens along the imaging optical path and provides a corresponding workpiece image exposure.

The metrology system further includes a movement mechanism portion comprising one or more movement mechanisms. The movement mechanism portion is configured to adjust a relative position between the front vision components portion and the workpiece in a direction that is transverse to the optical axis of the front vision components portion, and to adjust a relative position of the back vision components portion to be on the opposite side of the workpiece from the front vision components portion.

The metrology system further includes one or more processors, and a memory coupled to the one or more processors and storing program instructions that when executed by the one or more processors cause the one or more processors to at least:

(a) utilize the movement mechanism portion to adjust relative positions between the workpiece and the front and back vision components portions to align the optical axis of the front vision components portion with an aperture of the workpiece and to also align an optical axis of the back vision components portion with the aperture of the workpiece such that at least a portion of the light from the light source that passes through the diffuser of the back vision components portion passes through the aperture for providing at least part of the illumination for imaging the aperture;

(b) utilize the camera to acquire an image stack comprising a plurality of images of the aperture as illuminated at least in part by light from the light source that has passed through the diffuser, wherein each image of the image stack corresponds to a different focus position along the optical axis of the front vision components portion as corresponding to a phase timing of the periodic modulation of the optical power of the VFL lens; and (c) determine a measurement related to a workpiece feature of the aperture based at least in part on an analysis of the image stack.

For example, the analysis of the image stack may include determining focus curve data for the image stack which indicates a focus position at which the workpiece feature is in focus. The aperture may include a through-hole portion, and the workpiece features may include a first workpiece feature (e.g., an entrance of the through-hole portion) which is in focus at a first focus position and a second workpiece feature (e.g., an exit of the through-hole portion) which is in focus at a second focus position, and the determined measurement may be a distance between the first workpiece feature and the second workpiece feature (e.g., a length of the through-hole portion).

In various embodiments, the diffuser of the back vision components portion is configured to receive collimated light and to output diffuse light as the light which passes through the aperture for providing at least part of the illumination for imaging the aperture. In various embodiments, the diffuse light may be regarded as having/providing multiple characteristics/conditions that are respectively optimal for imaging multiple different focus positions of the aperture. Thus, the diffuse light provides suitable illumination for multiple measurements at different focus positions of the aperture.

According to another aspect, a method is provided for operating a metrology system. The method includes:

(a) adjusting relative positions between a workpiece and front and back vision components portions of a metrology system to align an optical axis of the front vision components portion with an aperture of the workpiece and to also align an optical axis of the back vision components portion with the aperture of the workpiece, such that at least a portion of light from a light source of the back vision components portion that passes through a diffuser of the back vision components portion passes through the aperture for providing at least part of the illumination for imaging the aperture, wherein the front vision components portion comprises a variable focal length (VFL) lens, an objective lens that defines the optical axis of the front vision components portion, and a camera;

(b) acquiring an image stack comprising a plurality of images of the aperture as illuminated at least in part by light from the light source that has passed through the diffuser, wherein each image of the image stack corresponds to a different focus position along the optical axis of the front vision components portion as corresponding to a phase timing of a periodic modulation of the optical power of the VFL lens; and (c) determining a measurement related to a workpiece feature of the aperture based at least in part on an analysis of the image stack.

According to a further aspect, a metrology system is provided which is configured to:

(a) utilize the movement mechanism portion to adjust relative positions between the workpiece and the front and back vision components portions to align the optical axis of the front vision components portion with an aperture of the workpiece and to also align the optical axis of the back vision components portion with the aperture of the workpiece such that at least a portion of the light from the light source that passes through the diffuser of the back vision components portion passes through the aperture for providing at least part of the illumination for imaging the aperture;

(b) utilize the camera to acquire an image stack comprising a plurality of images of the aperture as illuminated at least in part by light from the light source that has passed through the diffuser, wherein each image of the image stack corresponds to a different focus position along the optical axis of the front vision components portion as corresponding to a phase timing of the periodic modulation of the optical power of the VFL lens; and (c) determine a measurement related to a workpiece feature of the aperture based at least in part on an analysis of the image stack.

BRIEF DESCRIPTION OF THE SEVERAL VIEWS OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
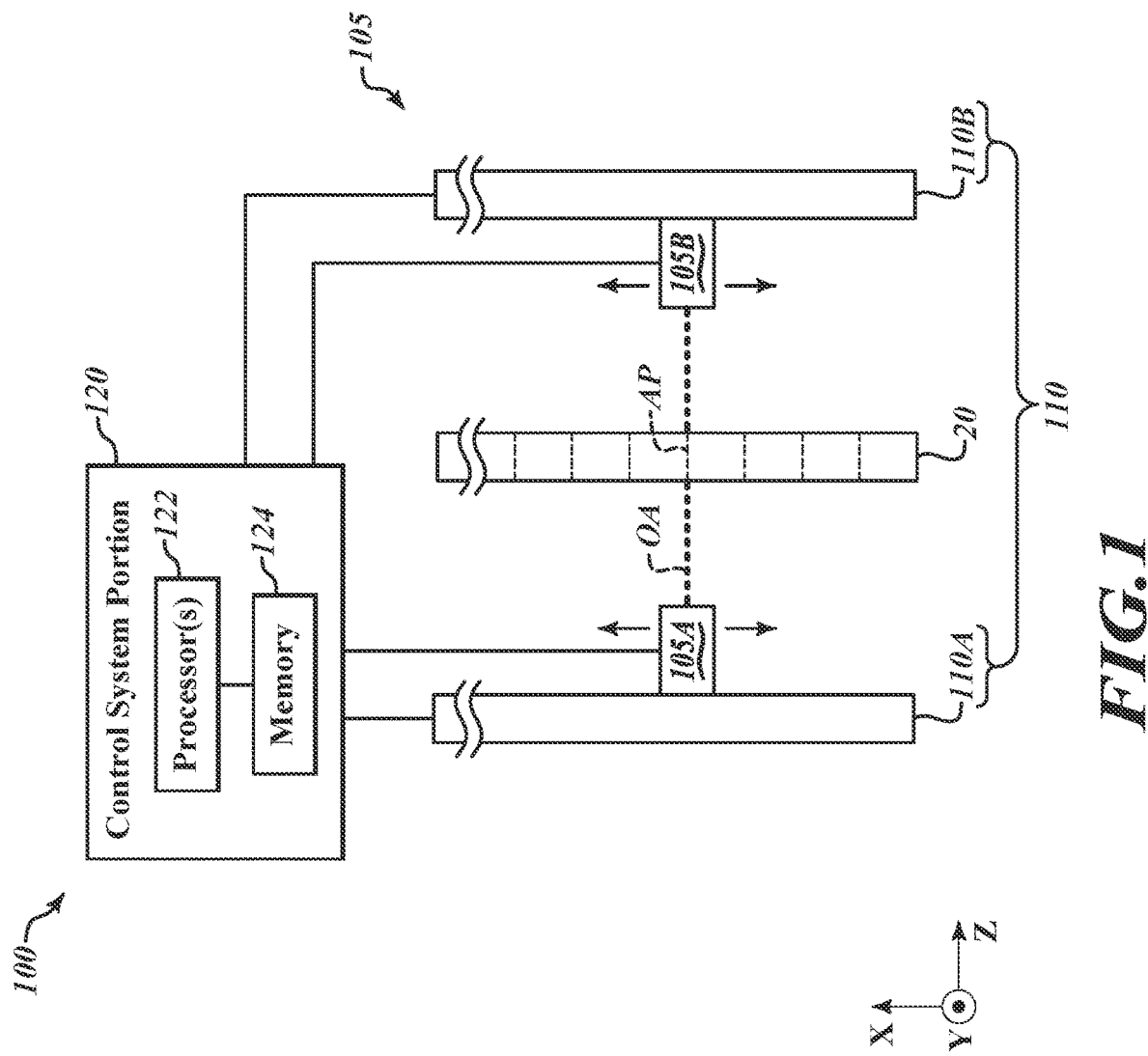
FIG. 1 is a schematic diagram of a metrology system that includes a front vision components portion and a back vision components portion and that may be operated according to principles disclosed herein.

Referring to FIG. 1, a metrology system 100 includes a vision components portion 105 and a control system portion 120. The vision components portion 105 includes a front vision components portion 105A, a back vision component portion 105B, and a movement mechanism portion 110. The movement mechanism portion 110 includes a front movement mechanism 110A (e.g., configured to move the front vision components portion 105A in a direction that is transverse to the optical axis OA of the front vision components portion 105A) and a back movement mechanism 110B (e.g., configured to move the back vision components portion 105B in a direction that is transverse to the optical axis OA of the back vision components portion 105B and to be aligned with the front vision components portion 105A). A workpiece 20 includes a plurality of apertures (e.g., shown at different X-axis locations as represented by dotted lines, and for which additional apertures may be included in the workpiece 20, such as approximately arranged in rows and/or columns, with each aperture having a unique X-axis and Y-axis location in the workpiece). Examples of apertures will be described in more detail below with respect to FIGS. 2, 6A and 6B. The apertures (e.g., including through-holes) each extend along the Z-axis through the workpiece 20. A particular example aperture AP is shown as aligned along an optical axis OA of the front vision components portion 105A and the back vision components portion 105B in the example of FIG. 1.

The movement mechanism portion 110 is utilized (e.g., including operation of the front movement mechanism 110A) to adjust a relative position between the front vision components portion 105A and the workpiece 20 to align the optical axis OA of the front vision components portion 105A with an aperture AP of the workpiece 20. The movement mechanism portion 110 is also utilized (e.g., including operation of the back movement mechanism 110B) to align the optical axis OA of the back vision components portion 105B with the aperture AP of the workpiece 20 such that light from the back vision components portion 105B (e.g., including at least a portion of light from a light source that passes through a diffuser (LD) of the back vision components portion 105B as will be described in more detail below with respect to FIG. 2) passes through the aperture AP for providing at least part of the illumination for imaging the aperture AP.

More specifically, in various implementations the movement mechanisms 110A and 110B are controlled (e.g., by the control system portion 120) to move the front vision components portion 105A and the back vision components portion 105B (e.g., back and forth and up and down in directions along the X-axis and the Y-axis) to acquire images of each aperture AP. For imaging each aperture, the optical axis OA of the front vision components portion 105A and the optical axis OA of the back vision components portion 105B are aligned with the aperture (e.g., similar to the aperture AP as shown in FIG. 1), and at least some light from the back vision components portion 105B passes through the aperture for imaging by a camera (CMOS) that is included in the front vision components portion 105A. As noted above, the front and back vision components portions 105A and 105B may be moved by the movement mechanism portion 110 (e.g., to a unique X-axis and Y-axis location for imaging each aperture). Further details of the configuration and operation of the metrology system 100 are described with reference to FIGS. 2 and 3 below.

The apertures (e.g., including through-hole portions) as defined in a workpiece, can be advantageously imaged and measured according to the present invention. In various implementations, the apertures may have a relatively high aspect ratio (e.g., of greater than 2 to 1). Such apertures may include, for example, Through Silicon Vias (TSV), aircraft through-hole features for skin panel fastening, through-holes in any large and/or thick workpieces, etc.

The control system portion 120 includes one or more processors 122 and a memory 124 coupled to the one or more processors and storing program instructions that when executed by the one or more processors cause the one or more processors to perform the functions described herein. Those skilled in the art will appreciate that the control system portion 120 (e.g., including or implemented in a computing system, etc.), and/or other processing or control systems described or usable with the elements and methods described herein, may generally be implemented using any suitable computing system or device, including distributed or networked computing environments, and the like. Such systems or devices may include one or more general purpose or special purpose processors 122 (e.g., non-custom or custom devices) that execute software (e.g., including stored program instructions) to perform the functions described herein. Such software may be stored in memory 124, such as random access memory (RAM), read only memory (ROM), flash memory, or the like, or a combination of such components. Software may also be stored in other types of memory 124, such as one or more storage devices, including optical based disks, flash memory devices, or any other type of non-volatile storage medium for storing data. Software may include program instructions implementing one or more program modules that include processes, routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

Figure 2:
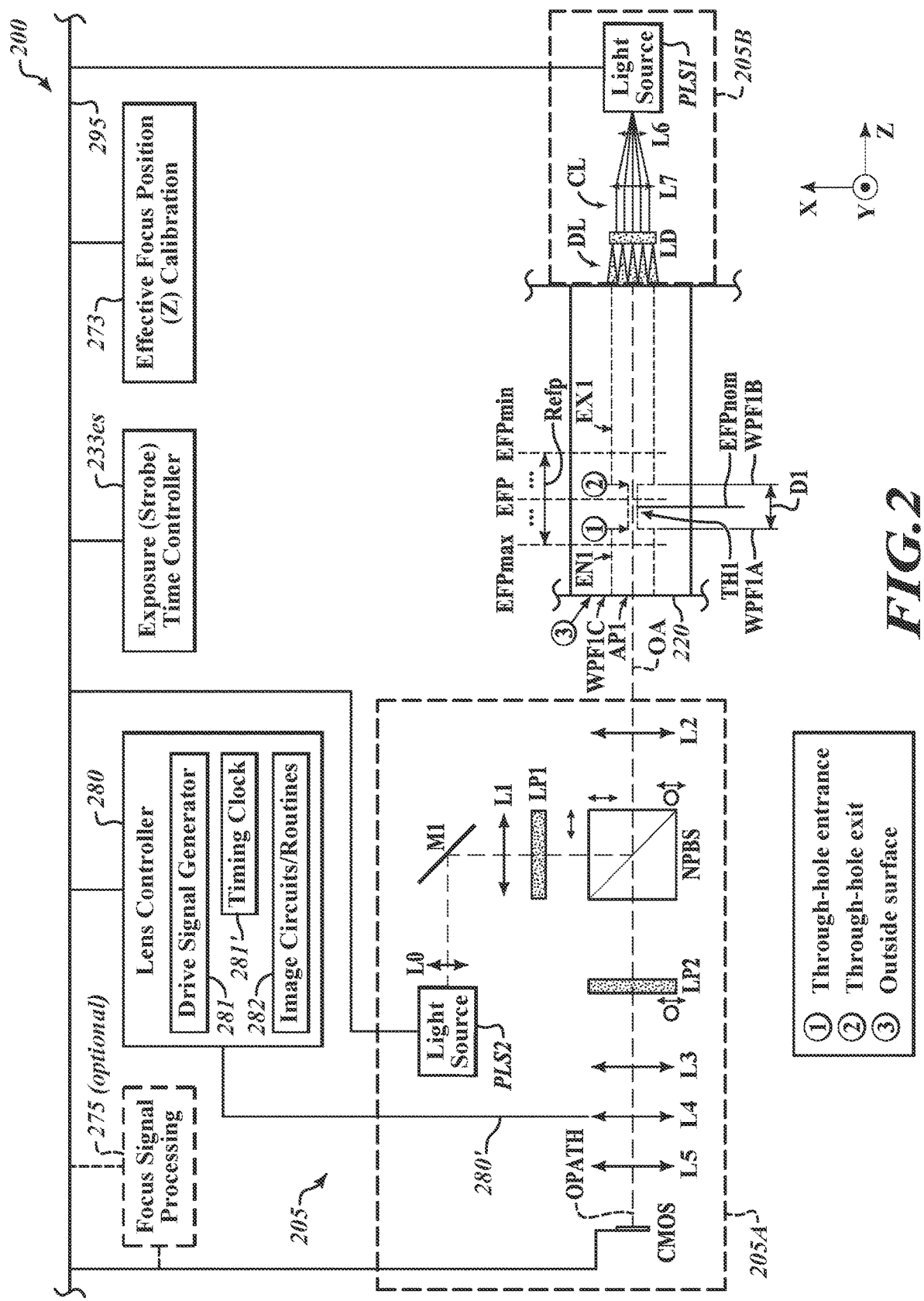
FIG. 2 is another schematic diagram of a metrology system that includes a front vision components portion and a back vision components portion and that may be operated according to principles disclosed herein.

FIG. 2 is a schematic diagram of a metrology system 200 that may be operated according to principles disclosed herein. As will be described in more detail below, an imaging optical path OPATH (which may also be referenced herein as a workpiece imaging optical path) comprises various optical components arranged along a path that conveys image light from a workpiece 220 to a camera CMOS (e.g., a "CMOS" camera as part of an optical system of the metrology system 200). The image light is generally conveyed along the direction of the optical axes OA of the various components. In the implementation shown in FIG. 2, the optical axes OA of various components are aligned. However, it will be appreciated that this implementation is intended to be exemplary only and not limiting. More generally, the imaging optical path OPATH may include mirrors and/or other optical elements, and may take any form that is operational for imaging the workpiece 220 using the camera CMOS according to known principles. In the illustrated implementation, the imaging optical path OPATH includes a VFL lens L4 and is utilized at least in part for imaging workpiece features of an aperture AP1 of the workpiece 220 during workpiece image exposures, along the optical axis OA of the front vision components portion 205A. As shown in FIG. 2, the metrology system 200 includes the front vision components portion 205A (e.g., which is coupled to and movable by a movement mechanism, such as the front movement mechanism 110A of FIG. 1) and the back vision components portion 205B (e.g., which is coupled to and movable by a back movement mechanism, such as the back movement mechanism 110B of FIG. 1). The metrology system 200 also includes a control system portion (e.g., such as the control system portion 120 of FIG. 1) which, in the illustrated example, comprises a lens controller 280, an exposure (strobe) time controller 233es, an effective focus position (Z-coordinate) calibration portion 273, and a workpiece focus signal processing portion 275 (optional), to be described later. In various implementations, additional components may also be included in the control system portion, for implementing the various functions as described herein. In various implementations, various components of the control system portion (e.g., including controllers, portions, etc.), and/or the front vision components portion 205A and/or the back vision components portion 205B may be interconnected by direct connections or one or more data/control busses (e.g., a system signal and control bus 295), and/or application programming interfaces, etc., and/or may be implemented, controlled and/or utilized by program instructions stored in a memory (e.g., memory 124) that are executed by one or more processors (e.g., processors 122) to perform the functions described herein. As illustrated in FIG. 2, the metrology system 200 is configured to have the workpiece 220 positioned between the front vision components portion 205A and the back vision components portion 205B. The back vision components portion 205B includes a light source PLS1 and a diffuser LD located in the path of the light from the light source PLS1. The diffuser LD may be at least one of an optical diffuser or a transparent light diffuser. In various embodiments, the diffuser LD is configured to receive collimated light CL and to output diffuse light DL as the light which passes through the aperture AP1 of the workpiece 220 for providing at least part of the illumination for imaging the aperture AP1. The back vision components portion 205B may further include a focusing lens L6 and a collimating lens L7 in the path of the light between the light source PLS1 and the diffuser LD. The collimating lens L7 may be provided and configured to provide the collimated light CL to the diffuser LD.

In various implementations, the front vision components portion 205A includes the VFL lens L4, an objective lens L2, and the camera CMOS. In the illustrated example, the front vision components portion 205A further includes relay optics L3 (e.g., that may include, for example, a tube lens and/or a relay lens, etc.), and a tube lens L5.

In various implementations, the front vision components portion 205A may further include a second light source PLS2 (e.g., as may be utilized for certain illumination and imaging functions in relation to certain features of the workpiece 220, such as in relation to a workpiece feature WPF1C, etc. as will be described later). In the general configuration shown in FIG. 2, the second light source PLS2 may be a "coaxial" or other light source configured to emit source light (e.g., with strobed/pulsed or continuous illumination) along an illumination path including a collimation lens L0, a reflecting mirror M1, a focus lens L1, a linear polarizer LP1, and a Non-Polarizing Beam Splitter NPBS, toward the objective lens L2 to illuminate and image the workpiece 220.

In the general configuration shown in FIG. 2, the first light source PLS1 (i.e., of the back vision components portion 205B) may be configured to emit the source light (e.g., with strobed/pulsed or continuous illumination) along an illumination path to illuminate and image the workpiece 220. In various implementations, strobed/pulsed illumination may be utilized in conjunction with the operation of the VFL lens L4 (e.g., as will be described in more detail below). After the workpiece 220 is illuminated, the objective lens L2 inputs the workpiece light arising from the workpiece 220, and transmits the workpiece light along the workpiece imaging optical path OPATH that passes through the VFL lens L4. As shown, the objective lens L2 defines the optical axis OA of the front vision components portion 205A. In the illustrated example, the workpiece imaging optical path OPATH includes the objective lens L2, along with the Non-Polarizing Beam Splitter NPBS, a linear polarizer LP2, the relay optics L3, the VFL lens L4, the tube lens L5 and the camera CMOS. In various alternative implementations, a Polarizing Beam Splitter PBS may be utilized in place of the Non-Polarizing Beam Splitter NPBS. The camera CMOS receives the workpiece light transmitted by the VFL lens L4 along the imaging optical path OPATH and provides a corresponding workpiece image exposure, as will be more fully described below. It will be appreciated that the configuration of the imaging optical path OPATH is not limited to the particular example illustrated in FIG. 2 and may be adapted to include more or less components as well as different components to meet the physical and/or optical specifications of each application.

The VFL lens L4 is controlled to periodically modulate optical power of the VFL lens over a range of optical powers that occur at respective phase timings within the periodic modulation. In various implementations, the VFL lens L4 may be a tunable acoustic gradient ("TAG" or "TAGLENS") lens that creates a lensing effect using sound waves in a fluid medium. The sound waves may be created by application of an electrical field at a resonant frequency to a piezoelectric tube surrounding the fluid medium to create a time varying density and index of refraction profile in the lens's fluid, which modulates its optical power and thereby the focal length (or effective focus position) of its optical system. A TAG lens may be used to periodically sweep a range of focal lengths (i.e., to periodically modulate its optical power) at a resonant frequency greater than 30 kHz, or greater than 70 kHz, or greater than 100 kHz, or greater than 400 kHz, up to 1.0 MHz for example, at a high speed. Such a lens may be understood in greater detail by the teachings of the article, "High speed varifocal imaging with a tunable acoustic gradient index of refraction lens" (Optics Letters, Vol. 33, No. 18, Sep. 15, 2008), which is hereby incorporated herein by reference in its entirety. TAG (aka TAGLENS) lenses and related controllable signal generators are available, for example, from Mitutoyo Corporation of Kanagawa, Japan. As a specific example, certain TAG lenses are capable of periodic modulation having a modulation frequency of up to 1.0 MHz. Various aspects of operating principles and applications of TAG lenses are described in greater detail in U.S. Pat. Nos. 10,178,321; 10,101,572; 9,930,243; 9,736,355; 9,726,876; 9,143,674; 8,194,307; and 7,627,162, each of which is hereby incorporated herein by reference in its entirety.

As will be described in more detail below, in various implementations, the VFL lens controller 280 may control a drive signal of the VFL lens L4 to periodically modulate optical power of the VFL lens over a range of optical powers that occur at respective phase timings within the periodic modulation (e.g., as will be described in more detail below with respect to FIGS. 4 and 5). The camera CMOS (e.g., including an imaging detector, such as a "CMOS" imaging detector) receives light transmitted along the imaging optical path OPATH through the VFL lens L4 and provides a corresponding workpiece image exposure. An effective focus position EFP in front of the objective lens L2 during an image exposure corresponds to the optical power of the VFL lens L4 (i.e., as operated in combination with the objective lens L2) during that image exposure. The exposure time controller 233es is configured to control an image exposure timing used for a camera image, as will be more fully described below.

In FIG. 2, only a portion of the workpiece 220 is shown which includes an example aperture AP1 amongst a potentially large number of apertures existing throughout the workpiece 220. In some implementations there may be many hundreds or thousands of apertures in a workpiece, for which, as will be described in more detail below, the configurations as disclosed herein may enable relatively rapid imaging of the apertures as part of processes for inspecting such workpieces.

The example aperture AP1 of FIG. 2 comprises an entrance portion EN1, a through-hole portion TH1, and an exit portion EX1. The through-hole portion TH1 comprises a first workpiece feature WPF1A (e.g., the entrance of the through-hole portion TH1) and a second workpiece feature WPF1B (e.g., the exit of the through-hole portion TH1). The illumination light from the first light source PLS1 of the back vision components portion 205B enters the aperture AP1 via the exit portion EX1, and travels through the through-hole portion TH1 via the second workpiece feature WPF1B and the first workpiece feature WPF1A, and exits the aperture AP1 through the entrance portion EN1 to be received by the front vision components portion 205A. As will be described in more detail below, in various implementations, the second workpiece feature WPF1B may be regarded as presenting particular challenges for achieving a desired level of image contrast, as compared to the first workpiece feature WPF1A, for which achieving a desired level of image contrast may be regarded as relatively less complex, due in part to the nature of the respective workpiece features and their relative locations with respect to the camera CMOS and light from the light source PLS1, etc.

The objective lens L2 of the front vision components portion 205A inputs the image light (workpiece light) that is focused at an effective focus position EFP (e.g., within the aperture AP1), and outputs the image light to travel back through the Non-Polarizing Beam Splitter NPBS, the linear polarizer LP2 and the relay optics L3 to the VFL lens L4. The VFL lens L4 receives the image light and outputs it to the tube lens L5. The tube lens L5 receives the image light and outputs it to the camera CMOS. In various implementations, the objective lens L2 may be an interchangeable objective lens. In various implementations, any of the lenses referenced herein may be formed from or operate in conjunction with individual lenses, compound lenses, etc.

In various implementations, the camera CMOS captures a camera image during an image exposure (e.g., during an integration period of the camera CMOS) also referred to as an image exposure period, and may provide the corresponding image data to the control system portion. Some camera images may include a workpiece image (e.g., including a workpiece feature of the aperture AP1 of the workpiece 220) provided during a workpiece image exposure. In some implementations, an image exposure (e.g., a workpiece image exposure) may be limited or controlled by a strobe timing of the first light source PLS1 that falls within an image integration period of the camera CMOS. In various implementations, the camera CMOS may have a pixel array greater than 1 megapixel (e.g., 1.3 megapixel, with a 1280× 1024 pixel array, with 5.3 microns per pixel). In the example of FIG. 2, the relay optics L3, the VFL lens L4 and the tube lens L5 may be in a configuration intended to maintain telecentricity at the workpiece 220, and may minimize scale change and image distortion (e.g., including providing constant magnification for each effective focus position (Z-coordinate) of the workpiece 220).

In various implementations, the lens controller 280 may include a drive signal generator portion 281, a timing clock 281', and imaging circuits/routines 282. The drive signal generator portion 281 may operate (e.g., in conjunction with the timing clock 281') to provide a periodic drive signal to the VFL lens L4 via a signal line 280' and may also generate and provide a synchronization signal to the first light source PLS1 and/or the second light source PLS2. In various implementations, the lens controller 280 may generally perform various functions related to imaging the workpiece 220 in a manner synchronized with a desired phase timing of the VFL lens L4, as well as controlling, monitoring and adjusting the driving and response of the VFL lens L4. In various implementations, the image circuits/routines 282 perform imaging operations for the optical system (e.g., as may be synchronized with the phase timing of the VFL lens L4).

With respect to the general operations of the VFL lens L4, in various implementations as described above, the lens controller 280 may rapidly adjust or modulate the optical power of the VFL lens L4 periodically, to achieve a high-speed VFL lens capable of a periodic modulation (i.e., at a VFL lens resonant frequency) such as 250 kHz, or 70 kHz, or 30 kHz, or the like. As shown in FIG. 2, by using the periodic modulation of a signal to drive the VFL lens L4, the effective focus position EFP of the front vision components portion 205A of the metrology system 200 (e.g., the focus position in front of the objective lens L2) may be rapidly moved within a range Refp (e.g., an autofocus search range or focus range, etc.) bound by an effective focus position EFPmax corresponding to a maximum optical power of the VFL lens L4 in combination with the objective lens L2, and an effective focus position EFPmin corresponding to a maximum negative optical power of the VFL lens L4 in combination with the objective lens L2. In various implementations, the effective focus positions EFPmax and EFPmin may approximately correspond to phase timings of 90 degrees and 270 degrees. In various implementations, an approximate middle of the range Refp may be designated as an effective focus position EFPnom, and may correspond to zero optical power of the VFL lens L4 in combination with the nominal optical power of the objective lens L2. According to this description, the effective focus position EFPnom may approximately correspond to the nominal focal length of the objective lens L2 in some implementations (e.g., which may correspond to a working distance of the objective lens L2).

In various implementations, the modulation of the VFL lens L4 may be utilized to acquire an image stack, such as described in U.S. Pat. Nos. 9,143,674 and 9,830,694, each of which is hereby incorporated herein by reference in its entirety. As described in the incorporated references, a periodically modulated focus position of the metrology system 200 of FIG. 2 may be controlled by periodically modulating the focal length of a VFL lens L4 (e.g., a TAG lens) in the metrology system 200. In various implementations, strobed illumination (e.g., from the light source PLS1 as controlled by the exposure time controller 233es) can be timed to correspond with a respective phase timing of the periodically modulated focus position to expose an image focused at a respective Z-coordinate. That is, while the camera CMOS is acquiring an image during an integration period, if a short strobe pulse is provided at a phase timing $\phi 0$, then the focus position will be at a height $z\phi 0$, and any workpiece surface of a workpiece feature of the aperture AP1 that is located at the height $z\phi 0$ will be in focus in the resulting image. Similar principles are applied for other exemplary phase timings and Z-coordinates throughout the focus range.

In various implementations, such processes may be utilized for obtaining an image stack. For example, as the VFL lens L4 and corresponding overall focus position of the optical system is modulated sinusoidally, different images of the workpiece are captured as corresponding to different phase timings and different corresponding Z-coordinates (different focus positions). As a simplified example, if the focus range Refp is 100 mm and images are captured in 1 mm steps, the image stack may include 100 images, with each captured image corresponding to a different Z-coordinate in 1 mm steps throughout the 100 mm focus range. U.S. Pat. No. 8,581,162 describes various techniques for the acquisition and utilization of image stacks, and is hereby incorporated herein by reference in its entirety. In various implementations, an image stack and/or images outside of an image stack may also be acquired in a system with or without a VFL lens (e.g., when a VFL lens is not utilized, the system may utilize a mechanical movement system to change a focus position along the Z-axis for obtaining an image of the workpiece feature).

In various implementations, the optional focus signal processing portion 275 may input data from the camera CMOS and may provide data or signals that are utilized to determine when an imaged surface region (e.g., of the aperture AP1 of the workpiece 220) is at an effective focus position. For example, in various implementations a group of images acquired by the camera CMOS at different effective focus positions (Z-coordinates), such as part of an image stack, may be analyzed using a known "maximum contrast" or "best-focus image" analysis to determine when an imaged surface region of the workpiece 220 is at a corresponding effective focus position (Z-coordinate). However, more generally, any other suitable known image focus detection configuration may be used. In any case, the workpiece focus signal processing portion 275 or the like may input an image or images acquired during the periodic modulation of the effective focus position (sweeping of multiple effective focus positions) of the front vision components portion 205A (e.g., utilizing the VFL lens L4 and/or a movement mechanism, etc.), and determine an image and/or image timing at which a target workpiece feature (e.g., of the aperture AP1 of the workpiece 220) is best-focused.

In some implementations, the focus signal processing portion 275 may determine a phase timing of the VFL lens L4 corresponding to a best-focus of the target workpiece feature and output that "best-focus" phase timing value to the effective focus position calibration portion 273. The effective focus position calibration portion 273 may provide effective focus position (Z-coordinate) calibration data that relates respective effective focus positions (Z-coordinates) to respective "best-focus" phase timings within a period of a standard imaging resonant frequency of the VFL lens L4, wherein in some instances the calibration data may generally correspond to operating the VFL lens L4 according to a standard imaging drive control configuration or reference state. For example, in various implementations, the signal data from the camera CMOS may correspond to one or more images acquired by the camera (e.g., as part of an image stack), wherein contrast or other focus metric determinations as part of points-from-focus operations or other analysis may be performed to determine when an imaged surface region of a workpiece feature of the workpiece 220 is at a "best-focus" position. Exemplary techniques for the determination and analysis of image stacks and focus curves, and for points-from-focus operations, are taught in U.S. Pat. Nos. 6,542,180; 8,581,162 and 9,060,117, each of which is hereby incorporated herein by reference in its entirety.

Generally speaking, the effective focus position calibration portion 273 comprises recorded effective focus position (Z-coordinate) calibration data (e.g., as determined by calibration processes such as those disclosed in the incorporated references). As such, its representation in FIG. 2 as a separate element is intended to be an example schematic representation only, and not limiting. In various implementations, the associated recorded effective focus position (Z-coordinate) calibration data may be merged with and/or indistinguishable from the lens controller 280, the workpiece focus signal processing portion 275, or a host computer system connected to the system signal and control bus 295, etc. In various implementations, the exposure (strobe) time controller 233es, the effective focus position calibration portion 273, the workpiece focus signal processing portion 275, the lens controller 280 and/or any other portions utilized for control, etc., of the front and back vision components portions 205A and 205B may be included as part of a control system portion (e.g., the control system portion 120 of FIG. 1) of the metrology system 200. In various implementations, such a control system portion or any portions thereof may be included as part of the front vision components portion 205A and/or the back vision components portion 205B.

In various implementations, the exposure (strobe) time controller 233es controls an image exposure time of the back and front vision components portions 205B and 205A (e.g., relative to a phase timing of the periodically modulated effective focus position). More specifically, in some implementations, during an image exposure, the exposure (strobe) time controller 233es (e.g., using the effective focus position (Z-coordinate) calibration data available in the effective focus position calibration portion 273), may control the first light source PLS1 of the back vision components portion 205B to strobe at a respective controlled time (e.g., so that each image of an image stack will be acquired at a different focus position corresponding to a known Z-coordinate within a focus range). For example, the exposure (strobe) time controller 233es may control the first light source PLS1 (e.g., a strobe light source) to strobe at a respective phase timing within a period of a standard imaging resonant frequency of the VFL lens L4, so as to acquire an image having a particular effective focus position (e.g., with a corresponding known Z-coordinate) within the sweeping (periodic modulation) range of the VFL lens L4. In other implementations, the exposure time controller 233es may control a fast electronic camera shutter of the camera CMOS of the front vision components portions 205A to acquire an image at a respective controlled time and/or its associated effective focus position (Z-coordinate). In some implementations, the exposure (strobe) time controller 233es may be merged with or indistinguishable from the camera CMOS. It will be appreciated that the operations of the exposure time controller 233es and other features and elements outlined above may be implemented to govern the image stack acquisition.

In certain implementations in which the second light source PLS2 is included in the front vision components portion 205A, the first linear polarizer LP1 may convert the light from the second light source PLS2 into linearly polarized light (e.g., with horizontal polarization). In various implementations, some or all of the polarization altering components of the system 200 (e.g., the first and second linear polarizers LP1 and LP2 of the front vision components portion 205A) may be tuned (e.g., adjusted in terms of orientation and/or position) in order to achieve a maximum contrast for images at a desired Z-coordinate.

In various implementations, strobed/pulsed illumination from the second light source PLS2 may be utilized in conjunction with the operation of the VFL lens L4 (e.g., similar to the operations of the first light source PLS1). In various implementations, strobed/pulsed illumination and/or continuous illumination may also or alternatively be utilized as part of certain other operations (e.g., where the front vision components portion 205A is mechanically moved along the Z-axis direction by the movement mechanism 110A of FIG. 1, or other movement mechanism, to be closer to or further from the workpiece 220 so as to change the focus position, etc.).

As a specific example of potential operations of the second light source PLS2, in one implementation the third workpiece feature WPF1C (e.g., at an entrance to the entrance portion EN1 of the aperture AP1, as may correspond to an outside surface of the workpiece 220) is to be imaged. In such an implementation, a movement mechanism (e.g., the movement mechanism 110A of FIG. 1 and/or other movement mechanism) may be configured and utilized to move the front vision components portion 205A along the Z-axis to change the focus position of the optical system relative to the workpiece 220 so that the third workpiece feature WPF1C will be in focus in a corresponding image that is to be acquired. In various implementations, a movement mechanism (e.g., the movement mechanism 110A and/or 110B) may include various controllable motors that drive actuators and/or other components for achieving motion of the vision components portion 205A and/or 205B along the X, Y and/or Z-axis directions.

A coordinate system of FIG. 2 is indicated as including orthogonal X, Y and Z-axes. In various implementations, the optical axis OA of the front vision components portion 205A and/or back vision components portion 205B may define and/or be aligned or parallel with, the Z-axis. In some implementations, the coordinate system may be a local coordinate system of the front vision components portion 205A and/or back vision components portion 205B (e.g., for which the optical axis OA of the front vision components portion 205A and/or back vision components portion 205B may define the Z-axis). In other implementations, the coordinate system may be a local coordinate system of the workpiece 220 (e.g., for which it may be desirable to have the optical axis OA of the front vision components portion 205A and/or back vision components portion 205B aligned with and/or parallel to the Z-axis). In other implementations, the coordinate system may be a local coordinate system of a movement mechanism that moves the front vision components portion 205A and/or back vision components portion 205B (e.g., the movement mechanism 110A and/or 110B, for which it may be desirable to have the optical axis OA of the front vision components portion 205A and/or back vision components portion 205B aligned with and/or parallel to the Z-axis of the coordinate system, and for which the movement mechanism may control movement of the front vision components portion 205A and/or back vision components portion 205B along the directions of the X and Y axes). In other implementations, other local coordinate systems may also or alternatively be established (e.g., for the images of the image stack, etc.). In various implementations, it may be desirable for any such local coordinate systems to generally have their Z-axes at least approximately aligned and/or in parallel, etc., with each other. In various implementations, as part of a local coordinate system, in addition to or as an alternative to X, Y and Z coordinates, certain types of cylindrical coordinates, Cartesian coordinates, or other coordinates may be utilized (e.g., with respect to the orientation of the vision components portion 205A and/or 205B and/or the determination of the coordinates of measured surface points, such as surface points within a cylindrical portion of the aperture AP1 of the workpiece 220, such as surface points of workpiece features of the through-hole portion TH1 of the aperture AP1, etc.).

In various implementations, it may be desirable to obtain an image stack that includes images of workpiece features located at different Z-coordinates (e.g., such as the first and second workpiece features WPF1A and WPF1B located at opposite ends of the through-hole portion TH1 of the aperture AP1 that is oriented along the Z-axis). In such implementations, an image stack may be acquired and operations may be performed, including determining first and second local focus peaks and/or other indicators (e.g., as indicating effective focus positions EFP corresponding to each of the first and second workpiece features WPF1A and WPF1B). In various implementations, an image stack for determining the focus positions of the first and second workpiece features WPF1A and WPF1B may include a sufficient number of images for determining focus positions of workpiece features with a high degree of accuracy (e.g., in some implementations at least 30 images, or at least 60 images, etc.).

In various implementations, the workpiece 220 (or the workpiece 20 in FIG. 1) may have many apertures extending through the workpiece (e.g., at least 1000, or 10000, or 100000 apertures, etc.). In various implementations, the dimensions of the workpiece 220 along the X and Y axes may be relatively large (e.g., greater than 1 meter, etc.) and for which the thickness along the Z-axis may be relatively less (e.g., less than 5%, 2%, or 1% of the dimension along the X and/or Y axes). In various implementations, it may be desirable to measure various aspects of the apertures, such as diameters and distances between various workpiece features of the apertures (e.g., diameters and distance between the first and second workpiece features WPF1A and WPF1B, etc.).

In operation, the workpiece 220 is positioned between the front vision components portion 205A and the back vision components portion 205B. The movement mechanisms 110A and 110B are utilized to adjust a relative position between the front vision components portion 205A and the workpiece 220 and between the back vision components portion 205B and the workpiece 220 in a direction that is transverse to the optical axis OA of both the front and back vision components portions 205A and 205B, to thereby align the optical axis OA of both the front and back vision components portions 205A and 205B with the aperture AP1 of the workpiece 220. The back vision components portion 205B is thus on the opposite side of the workpiece 220 from the front vision components portion 205A.

In this arrangement, at least a portion of the light from the first light source PLS1 of the back vision components portion 205B that passes through the focusing lens L6 and the collimating lens L7 as collimated light CL, then passes through the diffuser LD as diffuse light DL, and then passes through the aperture AP1 for providing at least part of the illumination for imaging the aperture AP1.

The camera CMOS of the front vision components portion 205A is utilized to acquire an image stack comprising a plurality of images of the aperture AP1 as illuminated at least in part by the diffuse light DL, wherein each image of the image stack corresponds to a different focus position along the optical axis OA of the front vision components portion 205A as corresponding to a phase timing of the periodic modulation of the optical power of the VFL lens L4. A measurement related to a workpiece feature of the aperture AP1, such as a distance between workpiece features of the aperture (e.g., a distance D1 between the first and second workpiece features WPF1A and WPF1B) and/or a diameter of the aperture AP1, etc., is determined based at least in part on an analysis of the image stack.

In various implementations, after the image stack is obtained, analysis of the image stack may be performed (e.g., including evaluating contrast and/or other factors) in order to determine the relative focus positions (e.g., in terms of Z-coordinates) of the first and second workpiece features WPF1A and WPF1B. A distance D1 between the workpiece features WPF1A and WPF1B may then be determined in accordance with a difference between the corresponding Z-coordinates. In further regard to such analysis, once an in-focus image for each workpiece feature WPF1A and WPF1B is determined (e.g., in accordance with an image in the image stack that is closest to the in-focus position for the respective workpiece feature), corresponding dimensions of the workpiece features may be determined utilizing the best focused images of the workpieces. For example, a diameter of each of the workpiece features may be determined by performing measurement operations on the respective in-focus image of the workpiece feature. In one implementation, an equivalent diameter may be determined by performing thresholding on an image, and determining a sum of the pixels within the threshold area (e.g., as representing an equivalent area of the workpiece feature), and from which an equivalent diameter may be determined (e.g., for which the equivalent area of the workpiece feature may be considered as a circular area with a corresponding equivalent diameter).

It will be appreciated that the disclosed configuration enables accurate measurements to be performed for workpiece features such as the second workpiece feature WPF1B, even when the workpiece 220 includes many such workpiece features as part of many apertures (e.g., over 1000 apertures, or over 100000 apertures, etc.) that need to be inspected/measured as part of an inspection/measurement process. For such workpieces, there may be some variances between the many apertures (e.g., in terms of lengths of various portions, diameters of various portions, etc.) for which it is advantageous to be able to quickly and accurately measure the desired workpiece features (e.g., to determine if the variances are within acceptable manufacturing tolerances, etc.). In this regard, the utilization of the disclosed configuration helps enable the system to accurately measure workpiece features such as the second workpiece feature WPF1B, even when such variances occur (e.g., as opposed to a system in which accurate measurements of workpiece features such as the second workpiece feature WPF1B depend on the workpiece features being within a narrow range of positions and/or sizes that the system is only configured to measure). More specifically, the configuration of FIG. 2 (i.e., including the back vision components portion 205B with the collimating lens L7 and diffuser LD for providing the diffuse light DL for the imaging and measuring functions) enables workpiece features (e.g., such as the second workpiece feature WPF1B) to be imaged with acceptable levels of contrast over a relatively large range of possible positions (e.g., along the Z-axis) of such workpiece features.

In various implementations, the aspect ratio of the aperture AP1 and/or certain portions thereof (e.g., the through-hole portion TH1) may be relatively high (e.g., greater than two to one) such that the dimension extending along the Z-axis is greater than the diameter or other cross dimension along the X and/or Y axis directions. In various implementations, the diffuser LD of the back vision components portion 205B helps ensure that sufficient light is directed into the aperture AP1 for the imaging (e.g., the imaging of the second workpiece feature WPF1B), even if there may be less than perfect alignment of the back vision component portion 205B with the aperture AP1. More specifically, in implementations where there may be some misalignments, the diffuser LD helps ensure that a sufficient amount of the diffuse light DL will be directed into the aperture AP1 for performing the desired imaging.

In various implementations, an image stack may be acquired for measuring the workpiece features WPF1A and WPF1B, as described herein, while for measuring the workpiece feature WPF1C, an autofocus cycle or other imaging process may be performed (e.g., which may in some implementations include utilizing a movement mechanism to move the front vision components portion 205A along the Z-axis as part of the autofocus cycle). In certain alternative implementations, an image stack may be acquired for measuring the workpiece feature WPF1C or for measuring all three of the workpiece features WPF1A, WPF1B and WPF1C.

In various implementations, a movement mechanism (e.g., the movement mechanism 110A of FIG. 1 and/or other movement mechanism) may also or alternatively be configured to rotate or otherwise move a different objective lens into the position of objective lens L2, for which the different objective lens may have a lower magnification and/or otherwise provide a larger range Refp in combination with the operation of the VFL lens L4, so that the workpiece feature WPF1C may fall within the increased range (e.g., and may be imaged as part of an image stack or individual image as part of the operation of the VFL lens L4, etc.). In various implementations, certain other methods may also or alternatively be utilized for increasing the range Refp (e.g., so that the workpiece feature WPF1C may fall within the increased range). For example, the lens controller may be configured/utilized to increase the resonant frequency of the VFL lens L4, to increase the optical power of the VFL lens L4 and correspondingly increase the range Refp. As another example, the lens controller 280 may be configured/utilized to increase the driving signal amplitude to the VFL lens L4, to increase the optical power of the VFL lens L4 and correspondingly increase the range Refp.

Figure 3:
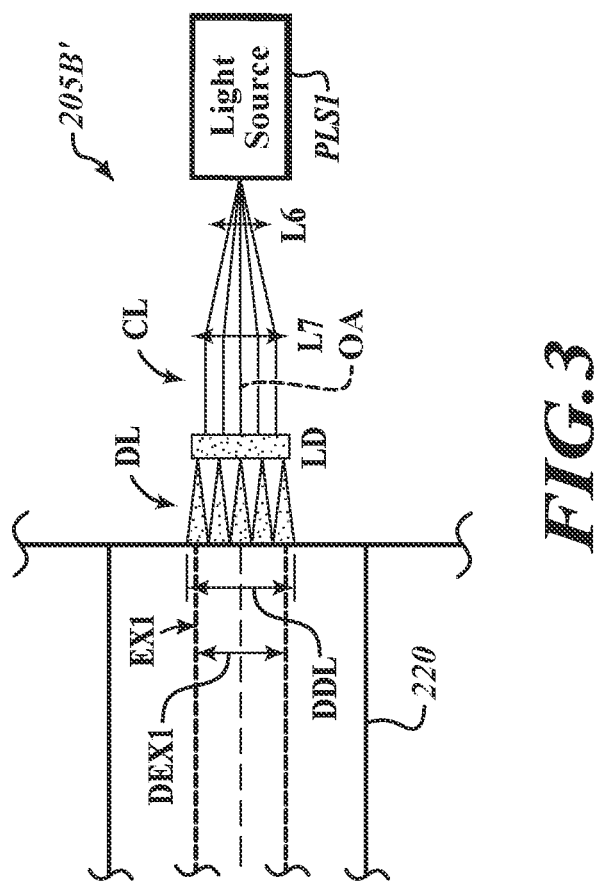
FIG. 3 is a schematic diagram of a back vision components portion according to principles disclosed herein.

FIG. 3 is a schematic diagram of a back vision components portion 205B' according to principles disclosed herein. The back vision components portion 205B' may be similar or identical to the back vision components portion 205B of FIG. 2, and will be understood to have similar or identical components and to operate similarly unless otherwise described below. As illustrated in FIG. 3, in various implementations, the back vision components portion 205B' (or the back vision components portion 205B of FIG. 2) may be configured such that a cross section of the diffuse light DL has a dimension DDL (e.g., a diameter or equivalent diameter) at (e.g., proximate to) the opening of the exit portion EX1 of the aperture AP1. In various implementations, the dimension DDL may be adjusted by adjusting the size of the illumination spot as produced by the collimated light CL on the diffuser LD.

In various implementations, the dimension DDL may be approximately equal to, or slightly larger than, a dimension DEX1 (e.g., a diameter or equivalent diameter) of the opening of the exit portion EX1, in order to optimize the illumination efficiency (e.g., so that a majority of the diffuse light DL is received within the opening of the exit portion EX1 for illuminating various parts of the aperture AP1, including the through-hole portion TH1, for imaging, etc.). In various implementations, the arrangement may be configured such that the dimension DDL is somewhat larger than the dimension DEX1 (e.g., to allow for certain tolerances in the alignment of the back vision components portion 205B' and associated components with the aperture AP1, etc., in relation to varying positional and/or angular alignments, etc.). Such an arrangement may also provide advantages when many apertures are being imaged on a workpiece within a limited period of time and the movement mechanism portion 110B is being utilized to quickly move the back vision components portion 205B' to be aligned with different apertures for which certain alignment tolerances may be desirable. It is noted that the disclosed configuration with the diffuse light DL does not require a precise alignment of an optical axis OA of the back vision components portion 205B' with an central axis of the aperture AP1 (e.g., as might be required in certain alternative illumination/lighting configurations). In various implementations, the optical axis OA of the back vision components portion 205B' may be defined by an optical axis of a component of the back vision components portion (e.g., an optical axis of the collimating lens L7, etc.) or according to a central axis of the back vision components portion 205B', etc.

Some example operations of the metrology system 100/200 and associated components of FIGS. 1-3 will be described in more detail below with respect to FIGS. 4 and 5.

Figure 4:
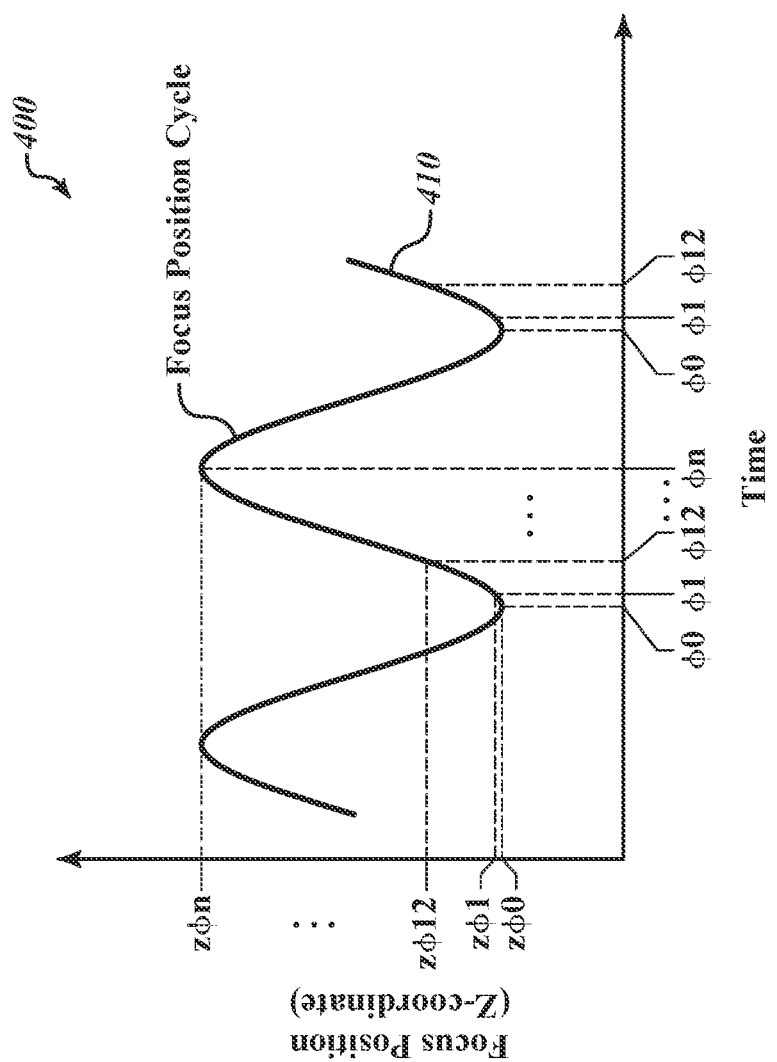
FIG. 4 is a chart of a timing diagram showing a periodically modulated focus position of the front vision components portion of FIGS. 1-2 as controlled by periodically modulating the focal length of a variable focal length (VFL) lens in the front vision components portion, and also qualitatively showing how strobed illumination can be timed to correspond with a respective phase timing of the periodically modulated focus position to expose an image focused at a respective Z-coordinate.

FIG. 4 is a chart of a timing diagram 400 illustrating a periodically modulated focus position of the metrology system 100/200 of FIGS. 1 and 2 as controlled by periodically modulating the focal length of the VFL lens L4 in the front vision components portion 105A/205A, as outlined above. In the illustrated example, each focus position has a corresponding Z-coordinate, for which an optical axis and/or focus axis of the front vision components portion 105A/205A may define and/or otherwise be aligned (e.g., be coaxial or in parallel with, etc.) a Z-axis of a corresponding coordinate system (e.g., for which the Z-coordinates may alternatively be referenced as Z-axis coordinates). The periodically modulated focus position is represented by a sinusoidal curve 410. The relationship of the focus position (i.e., as indicated by corresponding Z-coordinates) to the phase timing may be established by calibration according to known principles (e.g., by repeatedly stepping a surface to a known Z-coordinate, and then manually or computationally determining the phase timing that best focuses an image at the known Z-coordinate, and storing that relationship in a lookup table or the like).

The diagram 400 also qualitatively shows how strobed illumination can be timed to correspond with a respective phase timing (e.g., $\phi 0$, $\phi 1$, $\phi 12$, on, etc.) of the periodically modulated focus position to expose an image focused at a respective Z-coordinate (e.g., $z\phi 0$, $z\phi 1$, $z\phi 12$, $z\phi 0n$, etc.). That is, in the illustrated example, while the camera CMOS is acquiring an image during an integration period, if a strobe pulse is short relative to the period of the focus modulation and is provided at the phase timing $\phi 0$, then the focus position will be at the Z-coordinate $z\phi 0$, and any workpiece surface that is located at the Z-coordinate $z\phi 0$ will be in focus in the resulting image. A similar description applies for the other exemplary phase timings and Z-coordinates shown in the diagram 400.

It will be understood that the phase timings shown in the diagram 400 are exemplary only and not limiting. More generally, any phase timing selected by a user or automatically selected by a control system will have an associated focus position within the range of Z-coordinates $z\phi 0$-$z\phi n$, which represent the minimum and maximum Z-coordinates of the periodically modulated focus position. It will also be understood that if one strobe pulse at a particular phase timing is not sufficient to provide a well exposed image, the strobe pulse may be repeated at that particular phase timing for any desired number of periods within the image integration period (as schematically illustrated by the repeated instances of any of the exemplary phase timings $\phi 0$, $\phi 1$, $\phi 12$ in the diagram 400). For example, one, or several, or thousands, etc., of such pulses may be integrated in an integration period, in some embodiments or implementations. The effect will be to increase the image exposure corresponding to that particular phase timing and/or Z-coordinate in the resulting image. As one specific example implementation, for a variable focal length lens that modulates at a frequency of 72 kHz and an imaging array in a camera operating at 30 frames per second, a single camera frame acquisition time corresponds to 2,400 cycles of the variable focal length lens and the resulting focus position Z-coordinate. It will be appreciated that the exemplary phase timings $\phi 1$ and $\phi 12$ are shown on a rising slope of the focus position cycle. In some embodiments, pulses may also be integrated in an integration period which corresponds to the same Z-coordinates during a falling slope of the focus position cycle.

Figure 5:
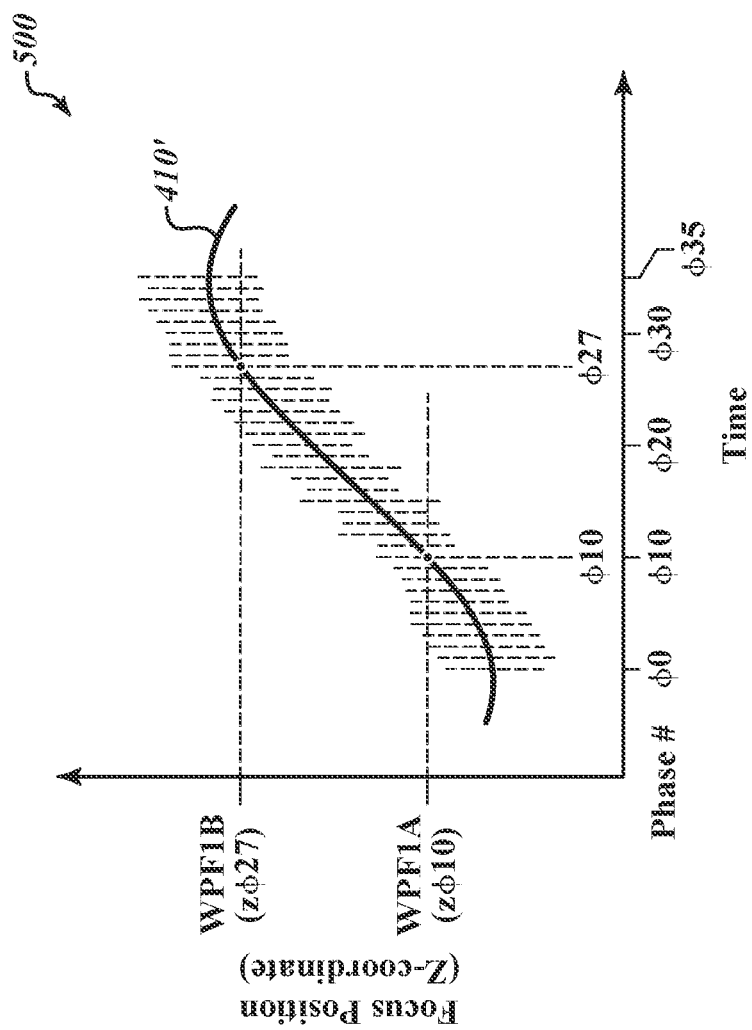
FIG. 5 is a chart showing an expanded portion of the periodically modulated focus position shown in FIG. 4, phase timings corresponding to those usable to collect an image stack, and also qualitatively showing how first and second instances of strobed illumination that correspond with first and second phase timings of the periodically modulated focus position can be utilized to produce corresponding exposure images that provide image focus for workpiece features that are located at different Z-coordinates.

FIG. 5 is a chart 500 showing a horizontally expanded portion 410' of the sinusoidal curve 410 of the periodically modulated focus position shown in FIG. 4, and phase timings corresponding to those usable to collect an image stack (e.g., represented by the phase timing positions of the vertical dashed lines in the chart 500). FIG. 5 also qualitatively shows how first and second particular instances of strobed illumination that correspond with first and second phase timings (e.g., in this particular example exemplary phase timings $\phi 10$ and $\phi 27$) of the periodically modulated focus position can be utilized to produce corresponding exposure images that provide image focus for workpiece features that are located at different Z-coordinates (e.g., such as a first workpiece feature located at a first Z-coordinate $Z\phi 10$ and a second workpiece feature located at a second Z-coordinate $Z\phi 27$).

Regarding the phase timings corresponding to those usable to collect an image stack (represented by the phase timing positions of the vertical dashed lines in the chart 500), in accordance with principles disclosed herein, in one implementation an image stack (or multiple image stacks) may be acquired with respect to one or more regions of interest of a representative workpiece. For example, an image stack may be acquired by exposing a first image using one or more strobe illumination pulses (e.g., over one or more periods) coinciding with the phase timing $\phi 0$. A second image in the image stack may be similarly acquired using the phase timing $\phi 1$, and so on up to phase timing $\phi 35$ in the illustrated example. It will be understood that an image stack images a field of view using various focus positions, and generally can include any desired number of images with focus positions corresponding to desired Z-coordinates, acquired using corresponding phase timings.

As noted above, FIG. 5 illustrates in part how first and second particular instances of strobed illumination that correspond with first and second phase timings (e.g., the exemplary phase timings $\phi 10$ and $\phi 27$) of the periodically modulated focus position can be utilized to produce corresponding exposure images that provide image focus for workpiece features that are located at different Z-coordinates (e.g., such as the first workpiece feature WPF1A located at a first Z-coordinate $z\phi 10$, and the second workpiece feature WPF1B located at a second Z-coordinate $z\phi 27$). As a specific example with respect to FIG. 2, the first and second workpiece features WPF1A and WPF1B at first and second Z coordinates could be an entrance and an exit, respectively, of the through-hole portion TH1 of the aperture AP1.

As illustrated in FIG. 5, the first and second workpiece features WPF1A and WPF1B in the field of view on a representative workpiece are indicated as having a sufficient image focus in respective images of an image stack. The first workpiece feature WPF1A is indicated as being best or sufficiently focused at a Z-coordinate $Z\phi 10$ which corresponds to a phase timing of $\phi 10$, and the second workpiece feature WPF1B is indicated as being best or sufficiently focused at a Z-coordinate $Z\phi 27$ which corresponds to a phase timing of $\phi 27$. In various implementations, the contrast in one or more regions of interest may be analyzed (e.g., according to known methods) in each image of an image stack. Utilizing such processes, the particular images and/or interpolated Z-coordinates indicated as providing the best or sufficient contrast and focus for the first and second workpiece features WPF1A and WPF1B, respectively, may be determined.

In various implementations, a determination of an image which has the best or sufficient image focus for a workpiece feature in a region of interest may be made according to various techniques. In one specific example implementation, a technique including an analysis of a focus curve may be utilized. A focus curve may be formed based on focus curve data points, which may be established according to known methods (e.g., as described in incorporated references).

Briefly, in one exemplary method, for each captured image in the image stack, a focus metric value is calculated based on the respective region of interest in that image, and that focus metric value becomes a data point on the focus curve (e.g., related to the corresponding phase timing and Z-coordinate at which the image was captured). This results in focus curve data, which may be referred to simply as a "focus curve" or "autofocus curve." Exemplary techniques for the determination and analysis of image stacks and focus curves are taught in U.S. Pat. Nos. 8,581,162; 9,060,117 and 10,880,468, each of which is hereby incorporated herein by reference in its entirety.

In various implementations, the analysis of an image stack includes determining focus curve data for the image stack which indicates a focus position at which a workpiece feature of the aperture AP1 is in focus (e.g., as may correspond to a local peak or other characteristic of the focus curve). For example, the focus curve data may indicate a first focus position at which the first workpiece feature WPF1A of the aperture AP1 is in focus, and a second focus position at which the second workpiece feature WPF1B of the aperture AP1 is in focus. A measurement related to the first and second workpiece features WPF1A and WPF1B may be made based on an analysis of the focus curve data. For example, a distance D1 between the first workpiece feature WPF1A and the second workpiece feature WPF1B may be determined based on an analysis of the focus curve data.

In various implementations, apertures in a workpiece may be formed through a drilling process (e.g., laser drilling, mechanical drilling, etc.) or other machining process. As part of such processes, certain workpiece features (e.g., the first and second workpiece features WPF1A and WPF1B) may correspond to an entrance and exit of a drilling hole (e.g., an entrance and exit of a through-hole portion, such as the through-hole portion TH1). In regard to such workpiece features, certain aspects may be important to inspect (e.g., due to the possibility of debris, extra material, or other imperfections that may remain at such an entrance or exit after the drilling or other machining process is complete, for which the presence of such imperfections may affect the performance of the workpiece, etc.).

As will be described in more detail below with respect to FIGS. 6A and 6B, imperfections (e.g., such as debris, extra material, etc.) at the first or second workpiece feature WPF1A or WPF1B (i.e., at the entrance or exit of the through-hole portion TH1) may generally be visible in an image that is well focused at the Z-coordinate of the respective workpiece feature.

Figure 6A:
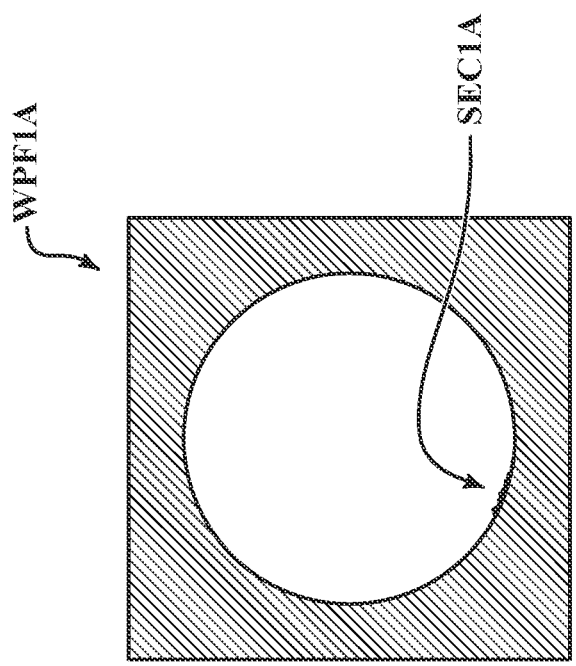
FIGS. 6A and 6B are relatively in-focus images of first and second workpiece features of an aperture that are located at different Z-coordinates, such as an entrance and an exit of a through-hole portion of the aperture, which may be captured by a metrology system operated according to principles disclosed herein.
Figure 6B:
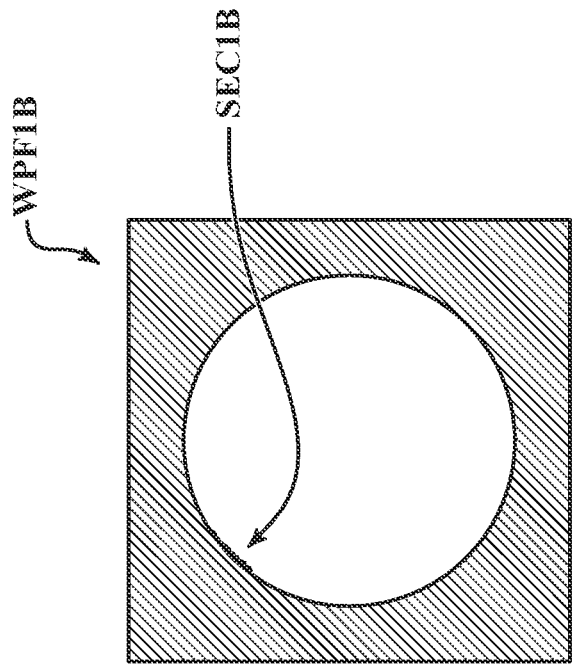

FIGS. 6A and 6B are relatively in-focus images of the first and second workpiece features WPF1A and WPF1B captured, for example, at phase timings of ϕ10 and ϕ27 as illustrated in FIG. 5, with the workpiece features WPF1A and WPF1B at Z-coordinates of ϕ10 and ϕ27, respectively. The through-hole portion TH1 may be formed by a drilling process, for which both the entrance and the exit have certain imperfections/defects. More specifically, sections SEC1A and SEC1B of the first and second workpiece features WPF1A and WPF1B, respectively, each illustrate a small amount of material extending into the through-hole portion TH1 as part of each respective workpiece feature (i.e., as an imperfection/defect relative to a desired perfectly round/circular workpiece feature at each end of the through-hole portion TH1, which may ideally be a perfectly cylindrical through-hole portion TH1). By obtaining in-focus images, imperfections in the sections SEC1A and SEC1B can be inspected, measured, etc., in the images of FIGS. 6A and 6B (e.g., to determine if the imperfections are within acceptable manufacturing tolerances, etc.).

As described above, the example aperture AP1 (e.g., of FIG. 2) comprises an entrance portion EN1, a through-hole portion TH1, and an exit portion EX1. The through-hole portion TH1 comprises the first workpiece feature WPF1A (e.g., the entrance of the through-hole portion TH1) and the second workpiece feature WPF1B (e.g., the exit of the through-hole portion TH1). For quality control purposes (e.g., when manufacturing a workpiece with through-hole portions), it may be desirable to measure certain features of the through-hole portions, although in some instances such features may be difficult to illuminate and measure (e.g., due to limited access and/or restricted sizes/spaces of the through-hole portions, etc.) One such feature that may be desirable to measure is the distance D1 between the first workpiece feature WPF1A (e.g., the entrance of the through-hole portion TH1) and the second workpiece feature WPF1B (e.g., the exit of the through-hole portion TH1). As described herein, this can be done, for example, by focusing the imaging system (e.g., of the front vision components portion 205A) on the first workpiece feature WPF1A, determining/measuring its focus position (i.e., corresponding to a first Z-coordinate), and then focusing the imaging system on the second workpiece feature WPF1B, and determining/measuring its focus position (e.g., corresponding to a second Z-coordinate). Such processes may be performed as part of the acquisition and analysis of an image stack, etc. The difference between the focus positions (e.g., the Z coordinates) is the distance D1. The focus positions can each be found according to a peak of a contrast measurement, as described herein.

In an alternative implementation to FIG. 2 where a diffuser (e.g., diffuser LD) is not included in the path of the light from the light source (i.e., where the collimated light CL would continue to the exit portion EX1 without passing through a diffuser), it has been experimentally determined that in some implementations the measuring of the distance D1 may be relatively less accurate. As a specific numerical example, in some instances it has been experimentally determined that such a configuration may result in determinations of distances D1 that may be 15-20% under sized (i.e., the determined distance D1 may be 15-20% less than the actual distance D1). Such differences may result at least in part due to the fact that, for the second workpiece feature WPF1B, the peak contrast signal (i.e., as utilized for determining the focus position/Z-coordinate for the second workpiece feature WPF1B) may be smaller than desired. This may be due, for example, to collimated/non-diffused light resulting in images of the second workpiece feature WPF1B in the image stack which result in lower contrast values. In some implementations, the lower contrast values may be due at least in part to an illumination halo around or otherwise proximate to the second workpiece feature WPF1B (e.g., as resulting from the illumination configuration providing the light without a diffuser). Alternatively or additionally, the lower contrast values may be due to imperfections (e.g., debris, etc. such as may cause increased contrast at other Z coordinates where the debris, etc. is located and may skew the determination/calculation of the peak contrast for the location of the second workpiece feature WPF1B). Other factors may also contribute to the lower contrast values, as may result at least in part from a utilization of an illumination configuration without a diffuser.

As disclosed herein, to address such issues, a configuration is provided for the back vision components portion 205B (e.g., including the diffuser LD as located in the path of the light from the light source PLS1), for which the resulting diffuse light DL results in a desirable imaging and a desirable peak contrast signal for determining the focus position/Z-coordinate for the second workpiece feature WPF1B, and also results in desirable peak contrast signals and imaging for other features (e.g., for the first workpiece feature WPF1A, any imperfections such as debris, etc. at various locations in the through-hole portion TH1, etc.). It will be appreciated that a single illumination configuration which enables such desirable imaging/peak contrast signals as part of a single image stack acquisition (e.g., utilizing the operations of the VFL lens) enables such data for all of the desired elements/features (e.g., the noted workpiece features, the corresponding positions/distances, imperfections such as debris, etc.) to be collected as part of a single continuous acquisition process (e.g., as part of acquiring a single image stack). This is in contrast to a process requiring utilization of multiple illumination configurations, which could require more time as well as raising issues of any changes that may occur when switching between use of the different illumination configurations, etc.

In accordance with the configuration for the back vision components portion 205B as described above, in various implementations, the light source PLS1 provides the light through the focusing lens L6, for which the light is then collimated by the collimating lens L7, and the collimated light CL is directed onto and forms an illumination spot on the diffuser LD (e.g., an optical diffuser, such as a transparent light diffuser), which provides the diffuse light DL (e.g., which may be referenced as diffuse collimated light) for illuminating and imaging (e.g., including shadow imaging) the aperture AP1, including the through-hole portion TH1 which includes the associated workpiece features (e.g., WPF1A, WPF1B, any imperfections such as debris, etc.). The spreading of the light rays by the diffuser LD essentially provides an average dispersion over certain desirable illumination conditions (e.g., including providing converging light, diverging light and/or collimated light as may each be desirable for imaging certain of the workpiece features). This effectively provides a compromise between optimizing (e.g., utilizing only one of converging light, diverging light or collimated light) for imaging any particular workpiece feature(s), and enables a single image acquisition process to be performed, such as acquiring an image stack including images of all of the desired workpiece features.

In various implementations, the size of the illumination spot as produced by the collimated light CL on the diffuser LD may be adjusted/configured to optimize the illumination efficiency (e.g., as depending on a numerical aperture (NA) restriction of the system, etc.). It is noted that there may be various components that may restrict the numerical aperture (NA) of the light/illumination in the configuration of FIG. 2 (e.g., such as the NA of the objective lens L2, the dimensions of the exit portion EX1, through-hole portion TH1 and/or entrance portion EN1, etc.) As a specific numerical example, in one implementation if the NA restriction of the system is 0.1 (6 degrees), then a 16 mm illumination spot on the diffuser LD which is placed 80 mm from the exit portion EX1 may be sufficient for the desired imaging/measurements. In various implementations, polarized imaging (e.g., including one or more polarizers such a polarizer LP2 in the front vision components portion 205A) may be utilized to suppress scattered light from the side walls of the through-hole portion TH1 (e.g., for which the scattered light may be reduced in some implementations by approximately ½, assuming the scattering is mostly random polarization).

It is noted that for imaging/measuring certain imperfections (e.g., debris, etc.), in various implementations it may be desirable to have at least some illumination that approximates collimated illumination/light (e.g., for shadow imaging which may provide desirable imaging of certain imperfections such as debris etc. within the through-hole portion TH1, for which any debris etc. may appear as dark areas in contrast to the bright center of the through-hole portion TH1 in the images). For such imaging, some amount of divergence of the illumination may also be desirable (e.g., to reduce sensitivity to mechanical alignment, such as the angular alignment of the optical axis of the back vision components portion 205B relative to the axis of the through-hole portion TH1).

It is further noted that for imaging/measuring the first workpiece feature WPF1A, in various implementations it may be desirable to have at least some illumination that approximates diverging illumination/light (e.g., for shadow imaging, such as of a knife edge type, that may provide high contrast for the location and size of the first workpiece feature WPF1A). It may be desirable for the numerical aperture (NA) corresponding to at least some of the illumination/light to be matched (e.g., may be slightly exceeding) to the NA restriction in the system (mechanical NA, the NA of the objective lens L2, etc.). This ensures that at least some of the light rays approaching first workpiece feature WPF1A at the largest angles (e.g., knife edge configuration) will be captured by the imaging system of the front vision components portion 205A. Thus, in certain implementations the contrast at the first workpiece feature WPF1A may be desirable (e.g., sufficiently large contrast) if the illumination passes the first workpiece feature WPF1A in a "knife edge" configuration (e.g., as may be achieved by having at least some illumination/light that approximates diverging illumination, as noted above).

It is further noted that for imaging/measuring the second workpiece feature WPF1B, in various implementations it may be desirable to have at least some illumination that approximates converging illumination/light (e.g., for shadow imaging, such as of a knife edge type, that may provide high contrast for the location and size of the second workpiece feature WPF1B). It may be desirable for the numerical aperture (NA) corresponding to at least some of the illumination/light to be matched (e.g., may be slightly exceeding) to the NA restriction in the system (mechanical NA, the NA of the objective lens L2, etc.). This ensures that at least some of the light rays approaching the second workpiece feature WPF1B at the largest angles (e.g., knife edge configuration) will be captured by the imaging system of the front vision components portion 205A. Thus, in certain implementations the contrast at the second workpiece feature WPF1B may be desirable (e.g., sufficiently large contrast) if the illumination passes the second workpiece feature WPF1B in a "knife edge" configuration (e.g., as may be achieved by having at least some illumination/light that approximates converging illumination, as noted above).

It is noted that an alternative illumination configuration (e.g., utilizing only collimated light and not utilizing a diffuser DL for illuminating an aperture AP1) has been experimentally determined in some implementations to produce less desirable imaging/measurements in particular of the second workpiece feature WPF1B (e.g., and in relation to the corresponding determined distance D1 between the workpiece features WPF1A and WPF1B. This may be contrasted with the disclosed configuration of FIG. 2, for which the back vision components portion 205B utilizing the illumination configuration including the diffuser LD for diffusing the collimated light CL to produce diffuse light DL produces more desirable and highly accurate imaging/measurements of the second workpiece feature WPF1B (e.g., and the corresponding distance D1 between the workpiece features WPF1A and WPF1B). In general, as noted above, the diffuser LD essentially provides an average dispersion over certain desirable illumination conditions, which enables a single image acquisition process such as acquiring an image stack including images of all of the noted workpiece features and results in desirable and highly accurate imaging/measurements of each of the noted workpiece features (e.g., including WPF1A, WPF1B, D1, any imperfections such as debris, etc.).

Figure 7:
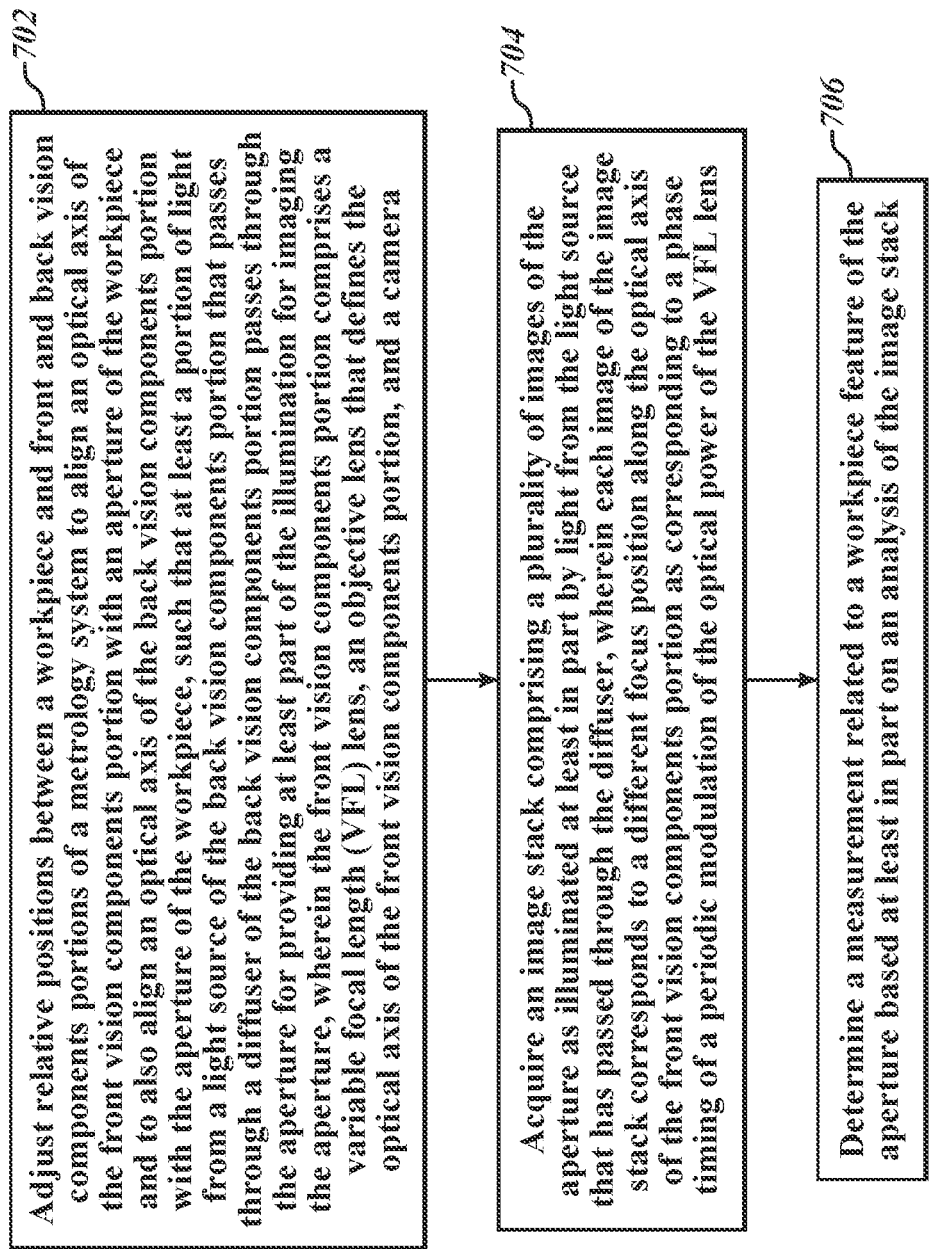
FIG. 7 is a flow diagram showing one example of a method for operating a metrology system including a front vision components portion and a back vision components portion to determine a measurement related to a workpiece feature of an aperture according to principles disclosed herein.

FIG. 7 is a flow diagram showing one example of a method for operating a metrology system 100, 200 including a front vision components portion 105A, 205A and a back vision components portion 105B, 205B to determine a measurement related to a workpiece feature of an aperture AP, according to principles disclosed herein.

Step 702 includes adjusting relative positions between a workpiece 20, 220 and front and back vision components portions 105A, 105B, 205A, 205B of a metrology system 100, 200 to align an optical axis OA of the front vision components portion 105A, 205A with an aperture AP, AP1 of the workpiece and to also align an optical axis OA of the back vision components portion 105B, 205B with the aperture AP, AP1 of the workpiece, such that at least a portion of light from a light source PLS1 of the back vision components portion 105B, 205B that passes through a diffuser LD of the back vision components portion 105B, 205B passes through the aperture AP, AP1 for providing at least part of the illumination for imaging the aperture. The front vision components portion 105B, 205B comprises a variable focal length (VFL) lens L4, an objective lens L2 that defines the optical axis OA of the front vision components portion 105A, 205A, and a camera CMOS.

Step 704 includes acquiring an image stack comprising a plurality of images of the aperture AP, AP1 as illuminated at least in part by light from the light source PLS 1 that has passed through the diffuser LD, wherein each image of the image stack corresponds to a different focus position along the optical axis OA of the front vision components portion 105A, 205A as corresponding to a phase timing $\phi n$ of a periodic modulation of the optical power of the VFL lens L4.

Step 706 includes determining a measurement related to a workpiece feature WPF1A, WPF1B of the aperture AP, AP1 based at least in part on an analysis of the image stack. In various implementations, the analysis of the image stack comprises determining focus curve data for the image stack which indicates a focus position at which the workpiece feature is in focus. In various implementations, the workpiece feature is a first workpiece feature WPF1A of the aperture AP, AP1 and the focus position is a first focus position, and the focus curve data further indicates a second focus position at which a second workpiece feature WPF1B of the aperture AP, AP1 is in focus, wherein the measurement comprises a distance D1 between the first workpiece feature WPF1A and the second workpiece feature WPF1B. In various implementations, the aperture AP, AP1 comprises a through-hole portion TH1, and the first and second workpiece features WPF1A and WPF1B correspond to an exit and entrance of the through-hole portion TH1, respectively.

As described above, for each image of the image stack, the light source PLS1 may be controlled to provide at least one instance of strobed illumination timed to correspond with a respective phase timing on of a periodically modulated focus position that corresponds to the respective focus position for that respective image of the image stack.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

All of the U.S. patents and U.S. patent applications referred to in this specification are incorporated herein by reference, in their entirety. Aspects of the implementations can be modified, if necessary to employ concepts of the various patents and applications to provide yet further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A metrology system, comprising:
a back vision components portion, comprising:
  a light source; and
  a diffuser located in the path of the light from the light source;
a front vision components portion, wherein the system is configured to have a workpiece positioned between the front vision components portion and the back vision components portion, the front vision components portion comprising:
  a variable focal length (VFL) lens that is controlled to periodically modulate optical power of the VFL lens over a range of optical powers that occur at respective phase timings within the periodic modulation;
  an objective lens that inputs workpiece light arising from the workpiece which is illuminated by the light source, and transmits the workpiece light along an imaging optical path that passes through the VFL lens, the objective lens defining an optical axis of the front vision components portion; and
  a camera that receives the workpiece light transmitted by the VFL lens along the imaging optical path and provides a corresponding workpiece image exposure;
a movement mechanism portion comprising one or more movement mechanisms, the movement mechanism portion configured to:
  adjust a relative position between the front vision components portion and the workpiece in a direction that is transverse to the optical axis of the front vision components portion; and
  adjust a relative position of the back vision components portion to be on the opposite side of the workpiece from the front vision components portion;
one or more processors; and
a memory coupled to the one or more processors and storing program instructions that when executed by the one or more processors cause the one or more processors to at least:
  (a) utilize the movement mechanism portion to adjust relative positions between the workpiece and the front and back vision components portions to align the optical axis of the front vision components portion with an aperture of the workpiece and to also align an optical axis of the back vision components portion with the aperture of the workpiece such that at least a portion of the light from the light source that passes through the diffuser of the back vision components portion passes through the aperture for providing at least part of the illumination for imaging the aperture;

(b) utilize the camera to acquire an image stack comprising a plurality of images of the aperture as illuminated at least in part by light from the light source that has passed through the diffuser, wherein each image of the image stack corresponds to a different focus position along the optical axis of the front vision components portion as corresponding to a phase timing of the periodic modulation of the optical power of the VFL lens; and (c) determine a measurement related to a workpiece feature of the aperture based at least in part on an analysis of the image stack.

2. The system of claim 1, wherein for each image of the image stack, the light source is controlled to provide at least one instance of strobed illumination timed to correspond with a respective phase timing of a periodically modulated focus position that corresponds to the respective focus position for that respective image of the image stack.

3. The system of claim 1, wherein the analysis of the image stack comprises determining focus curve data for the image stack which indicates a focus position at which the workpiece feature is in focus.

4. The system of claim 3, wherein the workpiece feature is a first workpiece feature of the aperture and the focus position is a first focus position, and the focus curve data further indicates a second focus position at which a second workpiece feature of the aperture is in focus, wherein the measurement comprises a distance between the first workpiece feature and the second workpiece feature.

5. The system of claim 4, wherein the aperture comprises a through-hole portion, and the first and second workpiece features correspond to an exit and entrance of the through-hole portion, respectively.

6. The system of claim 1, wherein the analysis of the image stack comprises determining an image of the image stack in which the workpiece feature is in focus, and the measurement comprises a dimension of the workpiece feature that is determined based at least in part on the in focus image.

7. The system of claim 1, wherein the diffuser is configured to receive collimated light and to output diffuse light as the light which passes through the aperture for providing at least part of the illumination for imaging the aperture.

8. The system of claim 7, wherein the back vision components portion further comprises a collimating lens in the path of the light between the light source and the diffuser and which provides the collimated light to the diffuser.

9. The system of claim 1, wherein the diffuser is at least one of an optical diffuser or a transparent light diffuser.

10. The system of claim 1, wherein the aperture has an aspect ratio of greater than 2 to 1.

11. The system of claim 1, wherein the VFL lens is a tunable acoustic gradient lens.

12. A method for operating a metrology system, the method comprising:

(a) adjusting relative positions between a workpiece and front and back vision components portions of a metrology system to align an optical axis of the front vision components portion with an aperture of the workpiece and to also align an optical axis of the back vision components portion with the aperture of the workpiece, such that at least a portion of light from a light source of the back vision components portion that passes through a diffuser of the back vision components portion passes through the aperture for providing at least part of the illumination for imaging the aperture, wherein the front vision components portion comprises a variable focal length (VFL) lens, an objective lens that defines the optical axis of the front vision components portion, and a camera;

(b) acquiring an image stack comprising a plurality of images of the aperture as illuminated at least in part by light from the light source that has passed through the diffuser, wherein each image of the image stack corresponds to a different focus position along the optical axis of the front vision components portion as corresponding to a phase timing of a periodic modulation of the optical power of the VFL lens; and (c) determining a measurement related to a workpiece feature of the aperture based at least in part on an analysis of the image stack.

13. The method of claim 12, wherein for each image of the image stack, the light source is controlled to provide at least one instance of strobed illumination timed to correspond with a respective phase timing of a periodically modulated focus position that corresponds to the respective focus position for that respective image of the image stack.

14. The method of claim 13, wherein the analysis of the image stack comprises determining focus curve data for the image stack which indicates a focus position at which the workpiece feature is in focus.

15. The method of claim 14, wherein the workpiece feature is a first workpiece feature of the aperture and the focus position is a first focus position, and the focus curve data further indicates a second focus position at which a second workpiece feature of the aperture is in focus, wherein the measurement comprises a distance between the first workpiece feature and the second workpiece feature.

16. The method of claim 15, wherein the aperture comprises a through-hole portion, and the first and second workpiece features correspond to an exit and entrance of the through-hole portion, respectively.

17. The method of claim 12, wherein the diffuser receives the light from the light source as collimated light and outputs diffuse light as the light which passes through the aperture for providing at least part of the illumination for imaging the aperture.

18. The method of claim 17, wherein the light from the light source passes through a collimating lens which provides the collimated light to the diffuser.

19. A metrology system, comprising:
a back vision components portion, comprising:
  a light source; and
  a diffuser located in the path of the light from the light source;
a front vision components portion, wherein the system is configured to have a workpiece positioned between the front vision components portion and the back vision components portion, the front vision components portion comprising:
  a variable focal length (VFL) lens that is controlled to periodically modulate optical power of the VFL lens over a range of optical powers that occur at respective phase timings within the periodic modulation;
  an objective lens that inputs workpiece light arising from the workpiece which is illuminated by the light source, and transmits the workpiece light along an imaging optical path that passes through the VFL lens, the objective lens defining an optical axis of the front vision components portion; and a camera that receives the workpiece light transmitted by the VFL lens along the imaging optical path and provides a corresponding workpiece image exposure;

a movement mechanism portion comprising one or more movement mechanisms, the movement mechanism portion configured to:

adjust a relative position between the front vision components portion and the workpiece in a direction that is transverse to the optical axis of the front vision components portion; and adjust a relative position of the back vision components portion to be on the opposite side of the workpiece from the front vision components portion;

wherein the system is configured to:

(a) utilize the movement mechanism portion to adjust relative positions between the workpiece and the front and back vision components portions to align the optical axis of the front vision components portion with an aperture of the workpiece and to also align the optical axis of the back vision components portion with the aperture of the workpiece such that at least a portion of the light from the light source that passes through the diffuser of the back vision components portion passes through the aperture for providing at least part of the illumination for imaging the aperture;

(b) utilize the camera to acquire an image stack comprising a plurality of images of the aperture as illuminated at least in part by light from the light source that has passed through the diffuser, wherein each image of the image stack corresponds to a different focus position along the optical axis of the front vision components portion as corresponding to a phase timing of the periodic modulation of the optical power of the VFL lens; and (c) determine a measurement related to a workpiece feature of the aperture based at least in part on an analysis of the image stack.

20. The system of claim 19, wherein:

for each image of the image stack, the light source is controlled to provide at least one instance of strobed illumination timed to correspond with a respective phase timing of a periodically modulated focus position that corresponds to the respective focus position for that respective image of the image stack;

the analysis of the image stack comprises determining focus curve data for the image stack which indicates a focus position at which the workpiece feature is in focus; and the workpiece feature is a first workpiece feature of the aperture and the focus position is a first focus position, and the focus curve data further indicates a second focus position at which a second workpiece feature of the aperture is in focus, wherein the measurement comprises a distance between the first workpiece feature and the second workpiece feature.

* * * * *